United States Patent [19]
Boux

[11] 3,942,012
[45] Mar. 2, 1976

[54] SYSTEM FOR MONITORING THE POSITION, INTENSITY, UNIFORMITY AND DIRECTIVITY OF A BEAM OF IONIZING RADIATION

[75] Inventor: Rene Boux, Paris, France

[73] Assignee: C.G.R.-Mev, Paris, France

[22] Filed: Jan. 21, 1974

[21] Appl. No.: 434,912

[30] Foreign Application Priority Data
Jan. 26, 1973  France .............................. 73.02839

[52] U.S. Cl. ................ 250/385; 250/305; 250/389
[51] Int. Cl.² ...................... G01T 1/18; H01J 39/28
[58] Field of Search ............ 250/385, 387, 389, 305

[56] References Cited
UNITED STATES PATENTS

| | | | |
|---|---|---|---|
| 2,566,684 | 9/1951 | Tobias | 250/385 |
| 3,067,350 | 12/1962 | Stebler | 250/385 |
| 3,414,726 | 12/1968 | Chameroy | 250/387 |
| 3,612,858 | 10/1971 | DeParry | 250/385 |
| 3,808,441 | 4/1974 | Boux | 250/385 |

*Primary Examiner*—Harold A. Dixon
*Attorney, Agent, or Firm*—Karl F. Ross; Herbert Dubno

[57] ABSTRACT

A monitoring device transparent to ionizing radiation, designed to measure the orientation, intensity and uniformity of an incident beam, comprises a cylindrical housing forming at least one ionization chamber with one or more ion-collecting electrodes transverse to the housing axis, each electrode being subdivided into a plurality of mutually insulated conductive elements connected to respective amplifiers. The elements of at least one electrode include one or more outer elements surrounding or bracketing one or more inner elements to measure the radiation in a central zone and a peripheral zone. The outputs of the respective amplifiers are additively and subtractively combined in an evaluation circuit.

6 Claims, 7 Drawing Figures

SYSTEM FOR MONITORING THE POSITION, INTENSITY, UNIFORMITY AND DIRECTIVITY OF A BEAM OF IONIZING RADIATION

This application contains subject matter disclosed in my copending application Ser. No. 243,208 filed Apr. 12, 1972, now U.S. Pat. No. 3,808,441.

The present invention relates to devices for monitoring beams of ionizing radiation and more particulary to a safety system including means for precisely determining the position of such a beam in relation to a target, as well as its intensity, 5 its uniformity and its directivity.

This device can be utilized equally for a beam of charged particles (beta rays, formed by electrons) and for a beam of uncharged particles ( X-rays constituted by photons ).

In certain devices which utilize beams of ionizing radiation, particularly in radiotherapy, it is necessary to know the beam characteristics ( position, intensity, uniformity, directivity ) with extreme accuracy, as otherwise their utilization can lead to severe injury.

Conventional measurement devices make it possible to determine the intensity of the beam and its position in relation to the center of the irradiated target, but they provide no indication of the uniformity of the beam.

In my above-identified prior U.S. Pat. No. 3,808,441 I have disclosed and claimed a device of this nature comprising a housing transparent to the radiation of an incident beam to be monitored, one or more ionization chambers in that housing containing an electrode or electrodes each formed from a pair of mutually insulated radiation-transparent, conductive elements with major surfaces transverse to the housing axis. The elements of each electrode are of substantially semicircular configuration and complement each other to a circular disk. Each disk segment thus intercepts a portion of the beam on a respective side of an axial plane. With the use of two axially spaced electrodes of this description, having segmental boundaries disposed at right angles to each other, the rate of ion collection in four quadrantal sectors can be measured and compared.

The object of my present invention is to provide a device of this general type furnishing a more positive indication of the centering of an incident beam on the chamber axis while also supplying data on overall beam intensity and uniformity.

I realize this object, in accordance with my present invention, by disposing certain of the electrode elements in a central zone containing the housing axis and other of these elements exclusively in a surrounding peripheral zone, and evaluation circuit connected to the electrode elements enabling comparison of the rates of ion collection in the two zones.

In the simplest case, a central portion and a surrounding annular portion of a disk-shaped array of electrode elements consist each of a single element. To facilitate measurements of uniformity, either or each of these electrode portions may be subdivided into a plurality of mutually insulated sectors. It is also possible, on the other hand, to use two axially spaced arrays having each an inner segmental portion bracketed by a pair of outer segmental portions, the segmental portions of one array extending at right angles to those of the other. In that instance the two mutually orthogonal inner portions overlap in the central zone to monitor the radiation thereof whereas the outer portions are confined to the peripheral zone. For a better understanding of the invention and to show how the same may be carried into effect, reference will be made to the accompanying drawing wherein:

Figure 1:
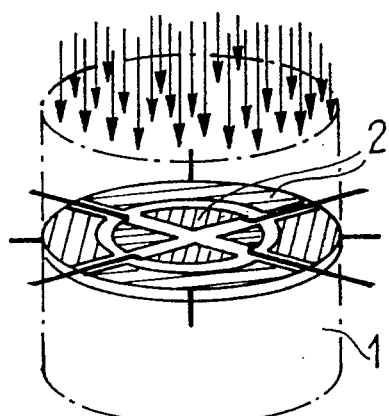
FIG. 1 illustrates an embodiment of a monitoring device in accordance with the invention.

In the embodiment shown in FIG. 1, the monitoring device in accordance with the invention comprises an ionization chamber 1 constituted by a metal cylinder closed at its ends by a thin wall, transparent to an incident beam of ionizing radiation, chamber 1 being provided with an electrode 2 constituted by eight elements electrically insulated from one another.

Figure 2:
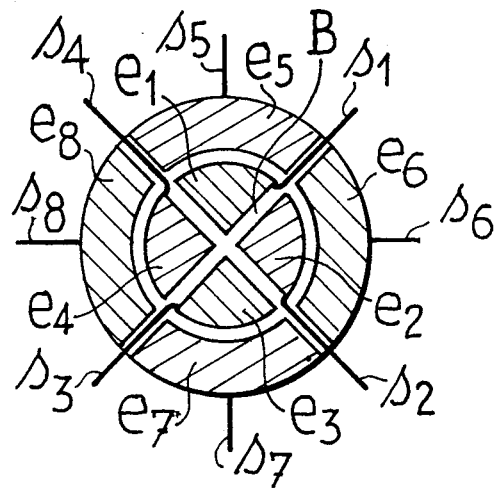
FIG. 2 illustrates in detail an electrode of the monitoring device shown in FIG. 1.

FIG. 2, in a more detailed fashion, shows this electrode 2 which can be realized with a sheet of polyethylene-terephthalate, commercially known as "MYLAR," upon which, by vaporization under vacuum for example, a metal film has been deposited. Insulating strips B (e.g. non-metallized portions of the sheet) separate the various elements $e_1, e_2, e_3, \ldots, e_8$ constituting the electrode 2, these elements being provided with respective output leads $s_1, s_2, s_3, \ldots, s_8$ each connected to an amplifier ( not shown in this Figure ) converting the relatively weak ion currents picked up by each of the elements $e_1, e_2, e_3 \ldots, e_8$ signals wich can readily be processed.

This embodiment requires eight amplifiers. However, it does not introduce any redundancy into the measurements, and a redundancy is sometimes required.

Figure 3:
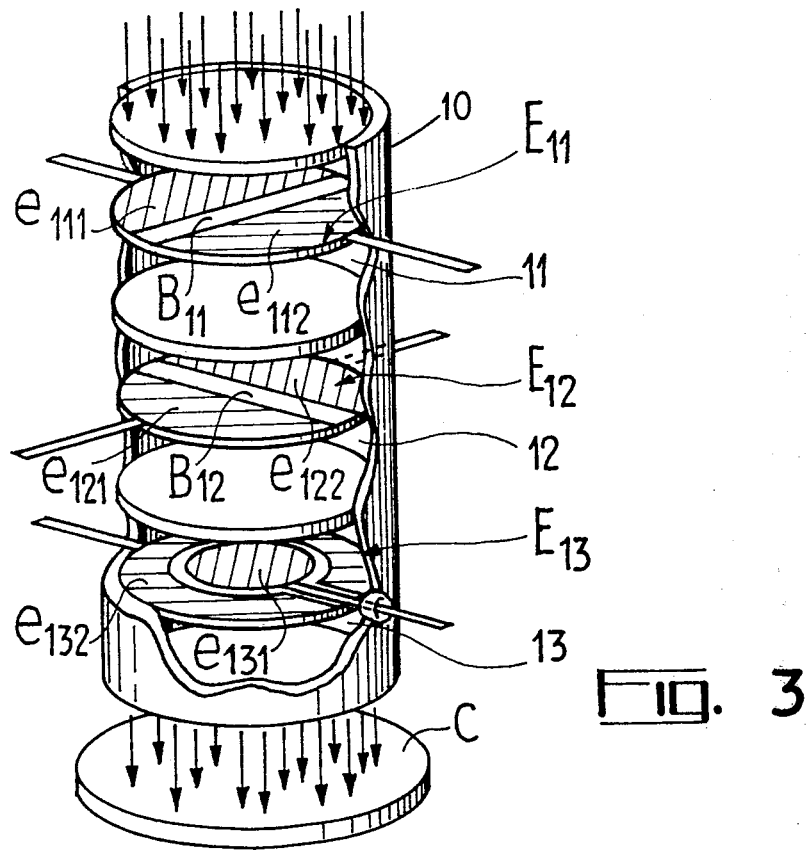

The embodiment of my invention shown in FIG. 3 makes it possible to achieve redundancy in the beam-intensity measurement. This device comprises a cylindrical housing 10 divided by radiation-transparent end walls and internal partitions into three ionization chambers 11, 12, 13 respectively equipped with electrodes $E_{11}$, $E_{12}$ and $E_{13}$ wich are electrically insulated from one another. The electrodes $E_{11}$ and $E_{12}$ are identical and are each constituted by two semicircular elements $e_{111}$, $e_{112}$ and $e_{121}$, $e_{122}$ respectively separated by insulating diametral strips $B_{11}$ and $B_{12}$ which are disposed at right angles to one another.

The electrodes $E_{11}$ and $E_{12}$ make it possible to monitor the centering and intensity of the beam of ionizing radiation, whereas the electrode $E_{13}$ enables monitoring of the uniformity and directivity of the beam. This electrode $E_{13}$ is constituted by a central circular element $e_{131}$, and a peripheral annular element $e_{132}$ concentrically surrounding same. The currents $I_{131}$ and $I_{132}$ respectively picked up by the elements $e_{131}$ and $e_{132}$, proportional to their areas $S_{131}$ and $S_{132}$, make it possible to monitor the uniformity of the beam successively passing through the ionization chambers $E_{11}$, $E_{12}$ and $E_{13}$, the condition of uniformity of the beam being given in this case by the expression:

$$\frac{I_{131}}{S_{131}} = \frac{I_{132}}{S_{132}}$$

Figure 7:
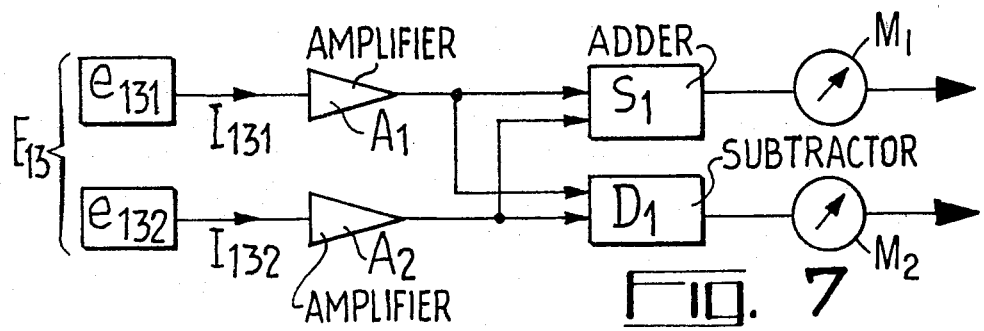
FIG. 7 schematically illustrates the measurement system associated with the two elements of an electrode of a monitoring device in accordance with the invention.

FIG. 7 illustrates an evaluation circuit associated with the elements $e_{131}$ and $e_{132}$ of the electrode $E_{13}$, analogous circuits being also associated with the electrodes $E_{11}$ and $E_{12}$. The circuit includes an additive branch $S_1$ and a subtractive branch $D_1$ whose outputs constitute the sum and the difference of $e_{131}$ and $e_{132}$, as intensified by respective amplifiers $A_1$ and $A_2$. These outputs are measured by respective indicators $M_1$ and $M_2$ providing the $e_{131}$ and $e_{132}$ and amplified by the amplifiers $A_1$ and $A_2$, the desired information pertaining to intensity and centering, uniformity and directivity of the beam of ionizing radiation designed to irradiate a target C shown in FIG. 3.

Figure 4:
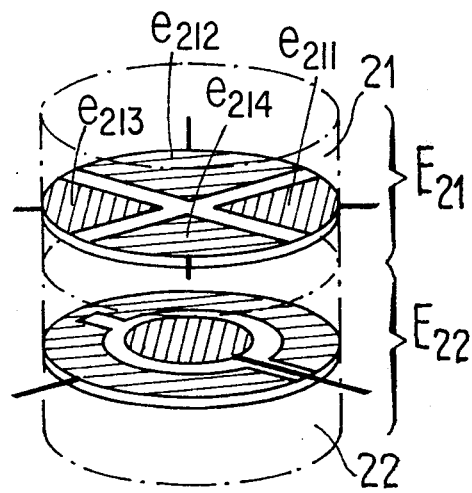
FIGS. 3, 4, 5, 6 illustrate other embodiments of a monitoring device in accordance with the invention.

Of course, the electrodes $E_{11}$ and $E_{12}$ can be replaced by a single electrode $E_{21}$ such as that shown in FIG. 4, constituted by four sectoral elements $e_{211}$, $e_{212}$, $e_{213}$ and $e_{214}$. In this case, the monitoring device comprises only two ionization chambers 21 and 22 and two electrodes $E_{21}$ and $E_{22}$, the electrode $E_{22}$ being identical with the electrode $E_{13}$ of the preceding example.

Figure 6:
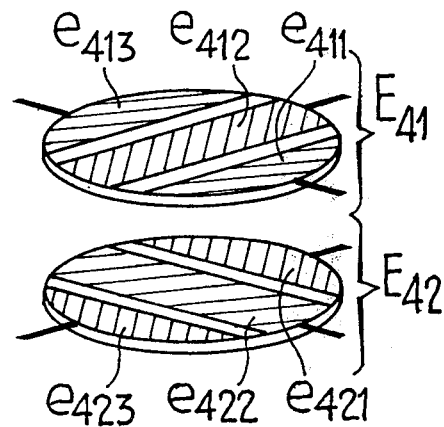
Figure 5:
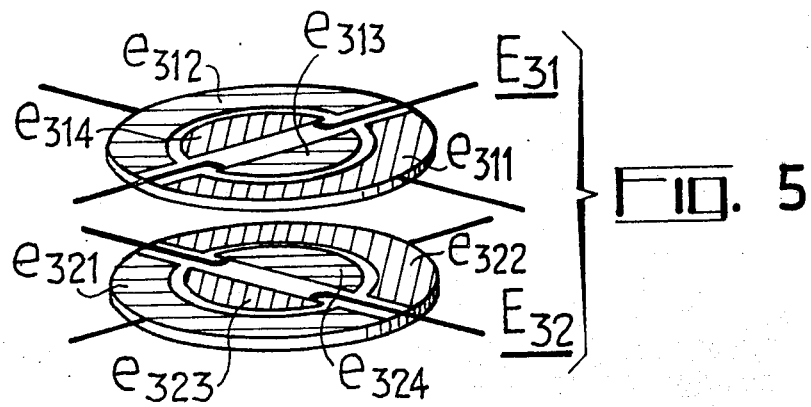

Other shapes of electrodes can also be used in a system according to my invention. Thus, in the case of two ionization chambers, it is possible for example to utilize electrodes $E_{31}$ and $E_{32}$ such as shown in FIG. 5, each comprising two outer and two inner sectoral elements $e_{311}$, $e_{312}$, $e_{313}$, $e_{314}$ and $e_{321}$, $e_{322}$, $e_{323}$, $e_{324}$, or again electrodes $E_{41}$, $E_{42}$, such as shown in FIG. 6, each comprising three elements $e_{411}$, $e_{412}$, $e_{413}$ and $e_{421}$, $e_{422}$, $e_{423}$ i.e. a central strip flanked by two outer segments. The examples given here are not intended in any way as limitative of the scope of the invention.

The device in accordance with the invention thus monitors the characteristics of a beam of ionizing radiation, and especially the distribution of the flow or stream in the radiation lobe obtained from a plate or target wich, under electron impact, emits X-rays.

What I claim is:

1. In a safety system for monitoring the intensity, uniformity and orientation of an incident beam of ionizing radiation, in combination:

a housing transparent to said radiation centered on an axis and forming at least one ionization chamber provided with ion-collecting electrode means; and evaluation means connected to said electrode means; said electrode means comprising a plurality of mutually insulated conductive elements transparent to said radiation with major surfaces transverse to said axis positioned to intercept different portions of the incident beam, certain of said elements being at least partly disposed in a central zone containing said axis, other of said elements being exclusively disposed in a peripheral zone surrounding said central zone, said evaluation means including circuitry for comparing the rates of ion collection by said elements in said central and peripheral zones.

2. The combination defined in claim 1 wherein said circuitry comprises an additive branch and a subtractive branch each with two inputs connected to receive ionization currents from said central and peripheral zones, respectively.

3. The combination defined in claim 1 wherein said housing is cylindrical, said elements forming at least one disk-shaped array.

4. The combination defined in claim 3 wherein said elements form a circular central electrode portion and a surrounding annular electrode portion.

5. The combination defined in claim 4 wherein at least one of said electrode portions is subdivided into a plurality of mutually insulated parts.

6. The combination defined in claim 3 wherein said elements form two axially spaced arrays each with an inner segmental portion and a pair of outer segmental portions bracketing said inner portion, the segmental portions of one array extending at right angles to those of the other array.

* * * * *